United States Patent
Hidding et al.

(10) Patent No.: US 9,797,504 B2
(45) Date of Patent: Oct. 24, 2017

(54) GEARBOX LUBRICATION SYSTEM

(71) Applicant: General Electric Company, Schenectady, NY (US)

(72) Inventors: Edwin Hidding, Rhede (DE); Stefan Rieken, Lathen (DE)

(73) Assignee: General Electric Company, Schenectady, NY (US)

( * ) Notice: Subject to any disclaimer, the term of this patent is extended or adjusted under 35 U.S.C. 154(b) by 268 days.

(21) Appl. No.: 14/620,282

(22) Filed: Feb. 12, 2015

(65) Prior Publication Data

US 2016/0238125 A1 Aug. 18, 2016

(51) Int. Cl.
| | |
|---|---|
| *F16H 57/04* | (2010.01) |
| *F16H 1/48* | (2006.01) |
| *F16H 37/08* | (2006.01) |
| *F16H 57/021* | (2012.01) |
| *F03D 15/00* | (2016.01) |
| *F03D 1/06* | (2006.01) |
| *F16H 1/28* | (2006.01) |
| *H02K 7/116* | (2006.01) |
| *H02K 7/18* | (2006.01) |
| *F03D 80/70* | (2016.01) |

(52) U.S. Cl.
CPC ........... *F16H 57/0486* (2013.01); *F03D 1/06* (2013.01); *F03D 15/00* (2016.05); *F03D 80/70* (2016.05); *F16H 1/28* (2013.01); *F16H 1/48* (2013.01); *F16H 37/0833* (2013.01); *F16H 57/021* (2013.01); *F16H 57/043* (2013.01); *H02K 7/116* (2013.01); *H02K 7/1838* (2013.01); *F05B 2260/40311* (2013.01); *F16C 2360/31* (2013.01); *F16C 2361/61* (2013.01); *Y02E 10/721* (2013.01); *Y02E 10/722* (2013.01)

(58) Field of Classification Search
CPC ............. F16H 57/0486; F16H 57/0479; F16H 57/021; F16H 57/0421; F16H 57/0424; F16H 57/0427; F03D 80/70; F03D 80/80
See application file for complete search history.

(56) References Cited

U.S. PATENT DOCUMENTS

| | | | |
|---|---|---|---|
| 7,214,157 B2 | 5/2007 | Flamang et al. | |
| 7,537,537 B2 * | 5/2009 | Smet | F16H 57/0479 184/6.12 |
| 8,128,525 B2 | 3/2012 | Dinter et al. | |
| 8,636,615 B2 * | 1/2014 | Suzuki | F16H 57/0479 475/159 |
| 2016/0208905 A1 * | 7/2016 | Obayashi | F16H 57/0427 |

FOREIGN PATENT DOCUMENTS

| | | | | |
|---|---|---|---|---|
| BE | CA 2550526 A1 * | 2/2007 | ......... | F16H 57/0479 |
| EP | 1 431 575 A2 | 6/2004 | | |

* cited by examiner

*Primary Examiner* — Stacey Fluhart
(74) *Attorney, Agent, or Firm* — Dority & Manning, P.A.

(57) ABSTRACT

The present disclosure is directed to a lubrication system for a gearbox that is part of a drivetrain assembly, e.g. of a wind turbine. The lubrication system includes a ring assembly having a first ring and a detached, second ring. The first and second rings are configured to fit within a gap located between a planetary gear system and a gearbox housing of the gearbox, e.g. due to operational and/or system tolerances. When installed, the first and second rings of the ring assembly are arranged together so as to form at least one opening therebetween, thereby being configured to direct a lubricant from the gearbox housing to the planetary gear system.

19 Claims, 7 Drawing Sheets

GEARBOX LUBRICATION SYSTEM

FIELD OF THE INVENTION

The present subject matter relates generally to wind turbines and, more particularly, to a gearbox lubrication system for a wind turbine.

BACKGROUND OF THE INVENTION

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator. More specifically, the gearbox generally includes a gearbox housing containing a plurality of gears (e.g., planetary, ring and/or sun gears) connected via a planetary carrier and bearings for converting the low speed, high torque input of the rotor shaft to a high speed, low torque output for the generator.

Lubrication systems are often used within wind turbines to circulate oil throughout the gearbox, thereby decreasing the friction between the rotating and stationary components of the gearbox as well as providing cooling for such components. In order for lubricant to reach the planetary bearings and/or the gear meshes of the gearbox, the lubricant must be transferred from the stationary gearbox housing to the rotating planetary carrier with minimum leakages.

In a typical wind turbine, however, a sufficient gap is required between the gearbox housing and the planetary carrier to avoid wear in a variety of operational and design conditions (e.g. bearing clearances, component deflections, etc.). Such a gap can allow for significant leakage of any lubricants traveling from the gearbox housing to the planetary carrier.

Accordingly, an improved gearbox lubrication system for a wind turbine that addresses the aforementioned issues would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a gearbox assembly that provides improved lubrication to its internal components. The gearbox assembly includes a gearbox housing, a planetary gear system configured within the gearbox housing such that a gap is defined therebetween, and a ring assembly configured within the gap between the planetary gear system and the gearbox housing. The planetary gear system includes a plurality of planet gears, at least one sun gear, at least one ring gear, and a planetary carrier operatively coupled with the plurality of planet gears. Further, the plurality of planet gears are engaged with the ring gear and configured to rotate about the sun gear. The ring assembly includes a first ring and a detached, second ring. Moreover, the first and second rings are arranged together so as to form at least one opening therebetween. Thus, the opening(s) is configured to direct a lubricant from the gearbox housing to the planetary gear system.

In one embodiment, at least a portion of the first ring contacts at least a portion of the second ring. In an alternative embodiment, the first ring is spaced apart from the second ring.

In another embodiment, the gap defined between the planetary gear system and the gearbox housing is located between the planetary carrier of the planetary gear system and the gearbox housing.

In additional embodiments, either or both of the first or second rings have one or more protrusions on at least one of their side surfaces. Thus, in a particular embodiment, the protrusion(s) of the first ring are configured to abut against the protrusion(s) of the second ring. Alternatively, either the first ring or the second ring has one or more protrusions, but not both. In such an embodiment, the protrusions of one of the ring portions are configured to abut against a side surface of the other ring portion.

In further embodiments, the first ring is fixed to the planetary carrier and the second ring is fixed to the gearbox housing. In an alternative embodiment, the first and second rings are both fixed to the same component. For example, both rings may be fixed to the planetary carrier or both rings may be fixed to the gearbox housing. In another embodiment, at least one of the first or second rings may be fixed to the gearbox housing. In a further embodiment, at least one of the first or second rings may be fixed to the planetary carrier.

In still another embodiment, the ring assembly may include one or more additional rings configured with the first and second rings.

In another aspect, the present disclosure is directed to a drivetrain assembly for a wind turbine having improved lubrication of its internal components. More specifically, the drivetrain assembly includes a gearbox assembly coupled to a generator, and a ring assembly within the gearbox assembly that is configured to improve lubrication of the internal gearbox components. The gearbox assembly includes a gearbox housing and a planetary gear system housed within the gearbox housing. The ring assembly is configured between the planetary gear system and the gearbox housing. Further, the ring assembly includes a first ring and a detached, second ring. The first and second rings are arranged together so as to form at least one opening therebetween. Thus, the opening(s) is configured to direct a lubricant from the gearbox housing to the planetary gear system. In addition, the gearbox assembly is configured to convert a low speed, high torque input to a high speed, low torque output to drive the generator. It should be understood that the drivetrain assembly may also include any additional features as described herein.

In yet another aspect, the present disclosure is directed to a lubrication system for a gearbox. The lubrication system includes a ring assembly having a first ring and a detached, second ring. The first and second rings are configured to fit within a gap located between a planetary gear system and a gearbox housing of the gearbox. Further, when installed, the first and second rings of the ring assembly are arranged together so as to form at least one opening therebetween. Thus, the opening(s) is configured to direct a lubricant from the gearbox housing to the planetary gear system. It should be understood that the lubrication system may also include any additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
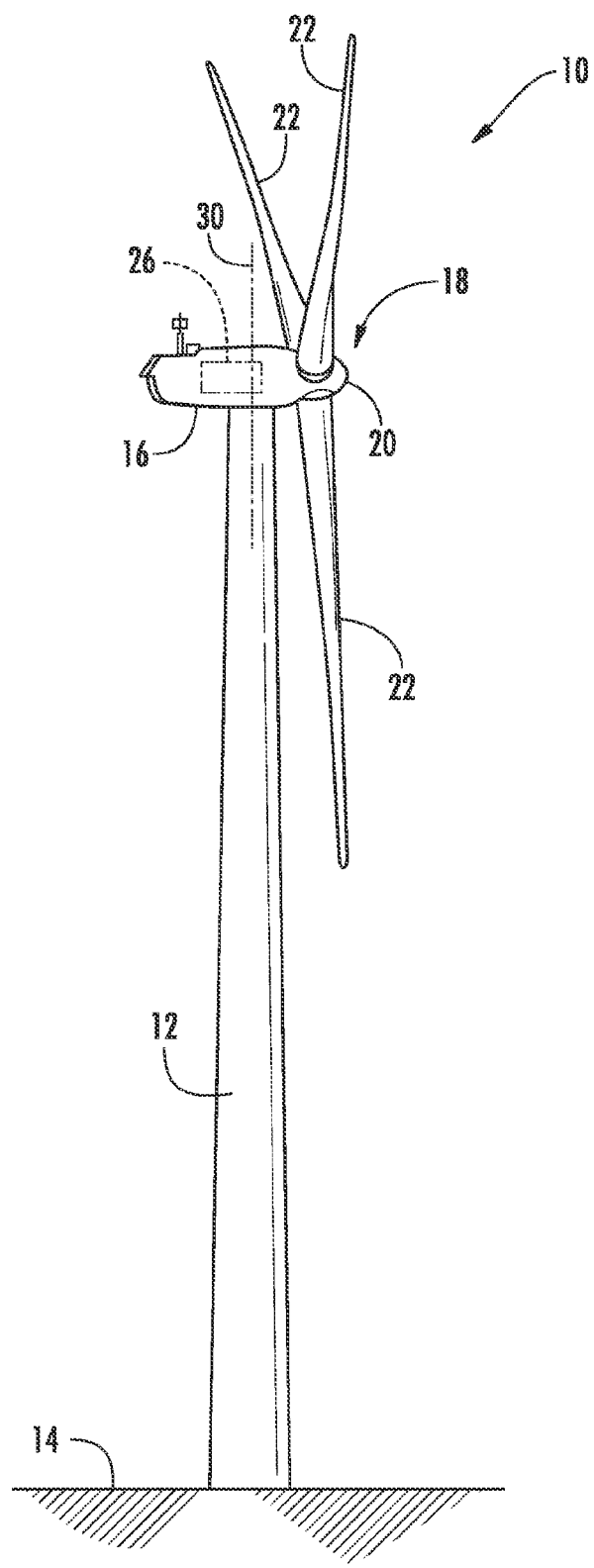
FIG. 1 illustrates a perspective view of one embodiment of a wind turbine of conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a gearbox assembly having an improved lubrication system. The gearbox assembly includes a gearbox housing, a planetary gear system configured within the gearbox housing, and a ring assembly configured between the planetary gear system and the gearbox housing. As mentioned, a gap is required between the planetary gear system and the gearbox housing to avoid wear in a variety of operational and design conditions. The present disclosure, therefore, takes advantage of the existing gap by including the ring assembly within the gap to prevent lubricant leaks. More specifically, the ring assembly includes a first ring and a detached, second ring. The first and second rings are arranged together so as to form at least one opening therebetween. Thus, the opening(s) is configured to direct a lubricant from the gearbox housing to the planetary gear system when installed within the gap.

The present disclosure provides many advantages not present in prior art lubrication systems. For example, the ring assembly of the present disclosure provides forced lubrication to the components of a planetary gear system and improves the lifetime and function of such components. Further, the ring assembly does not require machining or drilling of oil channels. Rather, the opening(s) of the ring assembly exist due to the design of the first and second rings.

Referring now to the drawings, FIG. 1 illustrates a perspective view of one embodiment of a wind turbine 10 of conventional construction. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
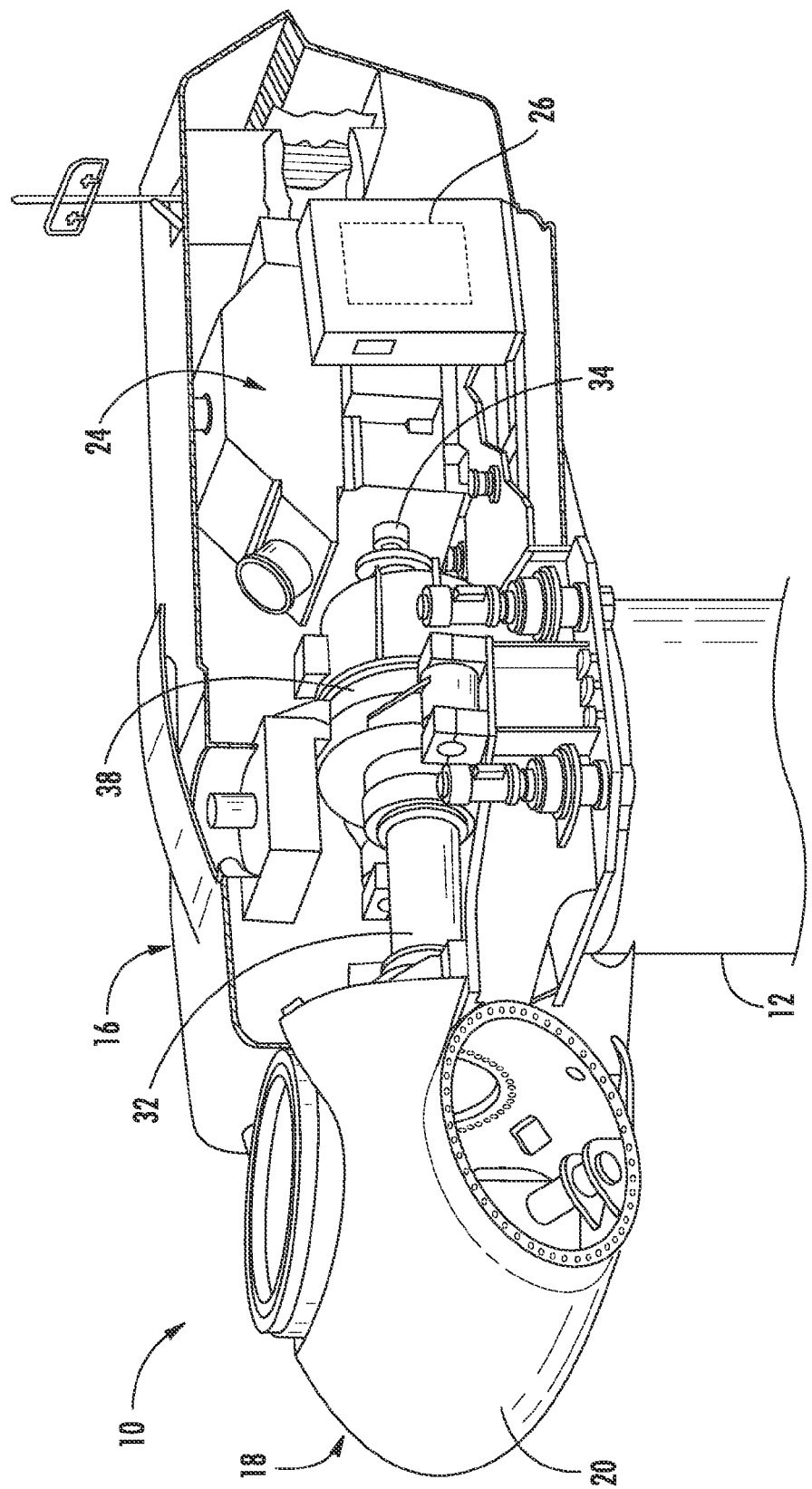
FIG. 2 illustrates a detailed, internal view of one embodiment of a nacelle of a wind turbine according to the present disclosure.

As shown, the wind turbine 10 may also include a turbine control system or a turbine controller 26 centralized within the nacelle 16. For example, as shown in FIG. 2, the turbine controller 26 is disposed within a control cabinet mounted to a portion of the nacelle 16. However, it should be appreciated that the turbine controller 26 may be disposed at any location on or in the wind turbine 10, at any location on the support surface 14 or generally at any other location. In general, the turbine controller 26 may be configured to transmit and execute wind turbine control signals and/or commands in order to control the various operating modes (e.g., start-up or shut-down sequences) and/or components of the wind turbine 10.

Referring now to FIG. 2, a simplified, internal view of one embodiment of a nacelle 16 of a wind turbine 10 is illustrated. As shown, a generator 24 may be disposed within the nacelle 16. In general, the generator 24 may be coupled to the rotor 18 of the wind turbine 10 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox assembly 36. As is generally understood, the rotor shaft 32 may provide a low speed, high torque input to the gearbox assembly 36 in response to rotation of the rotor blades 22 and the hub 20. The gearbox assembly 36 may then be configured to convert the low speed, high torque input to a high speed, low torque output to drive the generator shaft 34 and, thus, the generator 24. In alternative embodiments, the rotor shaft 32 may be eliminated and the rotatable hub 20 may be configured to turn the gears of the gearbox assembly 36, rather than requiring a separate rotor shaft 32.

Figure 3:
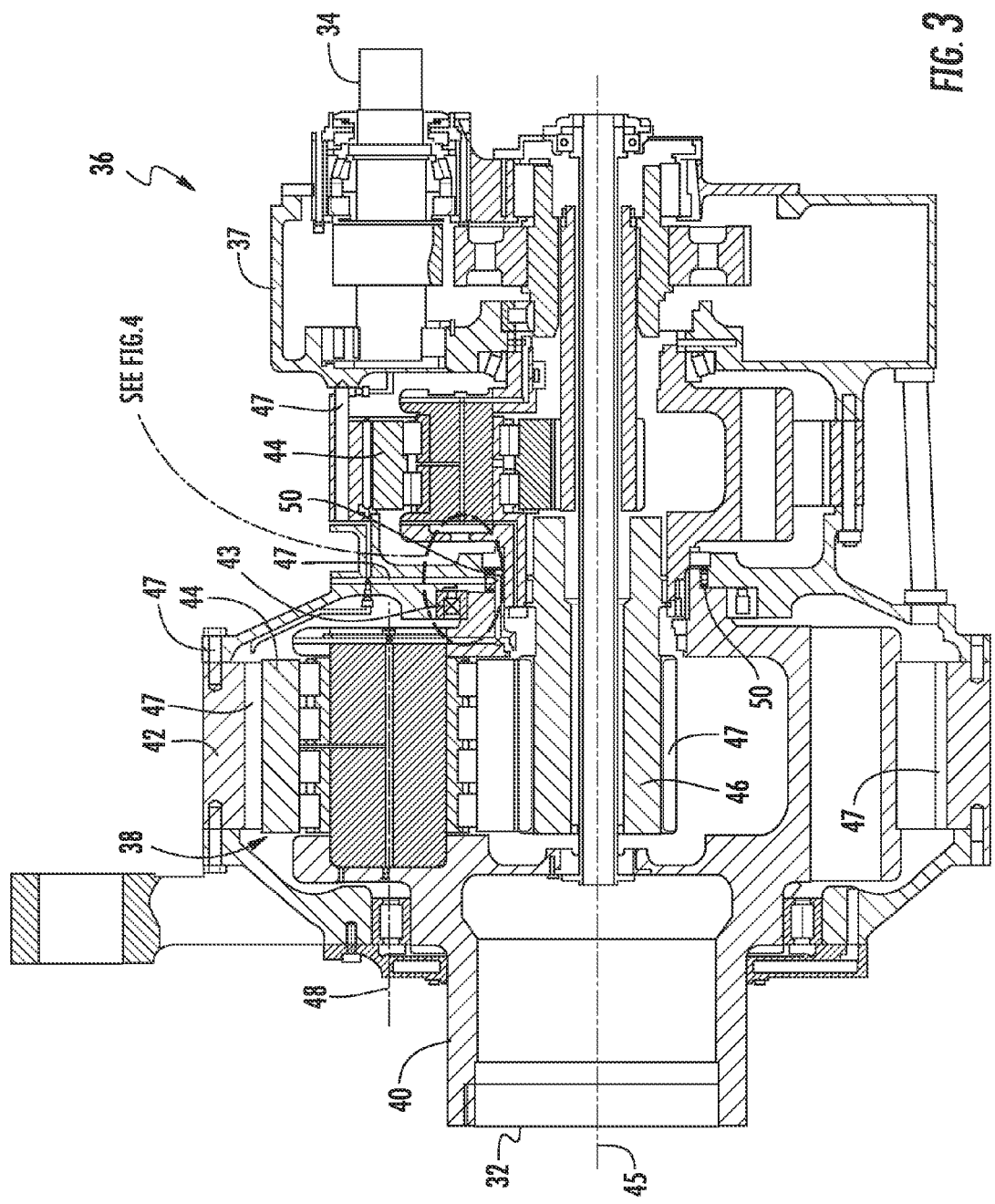
FIG. 3 illustrates a cross-sectional view of one embodiment of a gearbox assembly of a wind turbine according to the present disclosure.

It should be appreciated that the gearbox 36 may generally comprise any suitable gearbox components known in the art. For instance, as shown in FIG. 3, the gearbox assembly 36 may comprise a planetary gear system 38 housed within a gearbox housing 37. More specifically, the gear system 38 includes a plurality of gears (e.g., planetary, ring and/or sun gears) and bearings 43 for converting the low speed, high torque input of the rotor shaft 32 to a high speed, low torque output for the generator 24. For example, as shown, the input shaft 32 may provide an input load to the system 38 and the system 38 may provide an output load to the generator 24 (FIG. 2) as is generally known in the art. Thus, during operation, input load at an input rotational speed is transmitted through the planetary gear system 38 and provided as output load at output rotational speed to the generator 24.

In exemplary embodiments, the planetary gear system 38 is a single stage planetary gear system 38. Thus, the input rotational speed may be converted to the output rotational speed through a single stage of various mating gears, as discussed below. Alternatively, however, the planetary gear system 38 may be a multiple stage planetary gear system 38, and the input rotational speed may be converted to the output rotational speed through multiple stages of various mating gears.

More specifically, as shown, the planetary gear system 38 includes a planetary carrier 40 operatively coupling a plurality of gears. For example, the planetary gear system 38 in exemplary embodiments as shown includes a ring gear 42, one or more planet gears 44, and a sun gear 46. The system 38 may include one, two, three, four, five, six, seven, eight, or more planet gears 44. Further, each of the gears 42, 44, 46 includes a plurality of teeth. The teeth are sized and shaped to mesh together such that the various gears 42, 44, 46 engage each other. For example, the ring gear 42 and the sun gear 46 may each engage the planet gears 44. In addition, it should be understood that the gears 42, 44, 46 described herein may include any suitable type of gears, including but not limited to spur gears, face gears, worm gears, helical gears, double helical gears, or similar.

In some embodiments, the carrier 40 may be stationary. In these embodiments, the input shaft 32 may be coupled to the ring gear 42, and input loads on the input shaft 32 may be transmitted through the ring gear 42 to the planet gears 44. Thus, the ring gear 42 may drive the system 38. In other embodiments, the ring gear 42 may be stationary. In these embodiments, the input shaft 32 may be coupled to the carrier 40, and input loads on the input shaft 32 may be transmitted through the carrier 40 to the planet gears 44. Thus, the carrier 40 may drive the system 20. In still further embodiments, any other suitable component, such as the planet gear 44 or the sun gear 46, may drive the system 38.

The sun gear 46 in exemplary embodiments defines a central axis 45, and thus rotates about this central axis 45. The ring gear 42 may at least partially surround the sun gear 46, and be positioned along the central axis 45. For example, the ring gear 42 may be aligned with the sun gear 46 along the central axis 45, or may be offset from the sun gear 46 along the axis 45. The ring gear 42 may (if rotatable) thus rotate about the central axis 45.

Each of the planet gears 44 may be disposed between the sun gear 46 and the ring gear 42, and may engage both the sun gear 46 and the ring gear 42. For example, the teeth of the gears may mesh together, as discussed above. Further, each of the planet gears 44 may define a central planet axis 48, as shown. Thus, each planet gear 44 may rotate about its central planet axis 48. Additionally, the planet gears 44 and central planet axes 48 thereof may rotate about the central axis 45.

The gearbox assembly 36 may also include a lubrication system or other means for circulating oil throughout the gearbox 36. For example, as shown in FIG. 3, the gearbox 36 may include a plurality of oil passages 47 that are configured to transfer oil throughout the gearbox 36. As is generally understood, the oil may be used to reduce friction between the moving components of the gearbox 36 and may also be utilized to provide cooling for such components, thereby decreasing component wear and other losses within the gearbox 36 and increasing the lifespan of the gearbox 36. In addition, the oil may contain properties that prevent corrosion of the internal gearbox components.

As mentioned, the gearbox housing 37 and the planetary gear system 38 of the gearbox assembly 36 are designed to have a sufficient gap 41 therebetween to avoid wear in a variety of operational and design conditions (e.g. bearing clearances, component deflections, etc.). Accordingly, the gap 41 is configured to prevent damage that may be caused by constant contact between the gearbox housing 37 and the planetary gear system 38 during operation. Though the gap 41 is required for efficient gearbox design, it may allow undesired lubricant leakage, e.g. from the oil passages 47.

Figure 4:
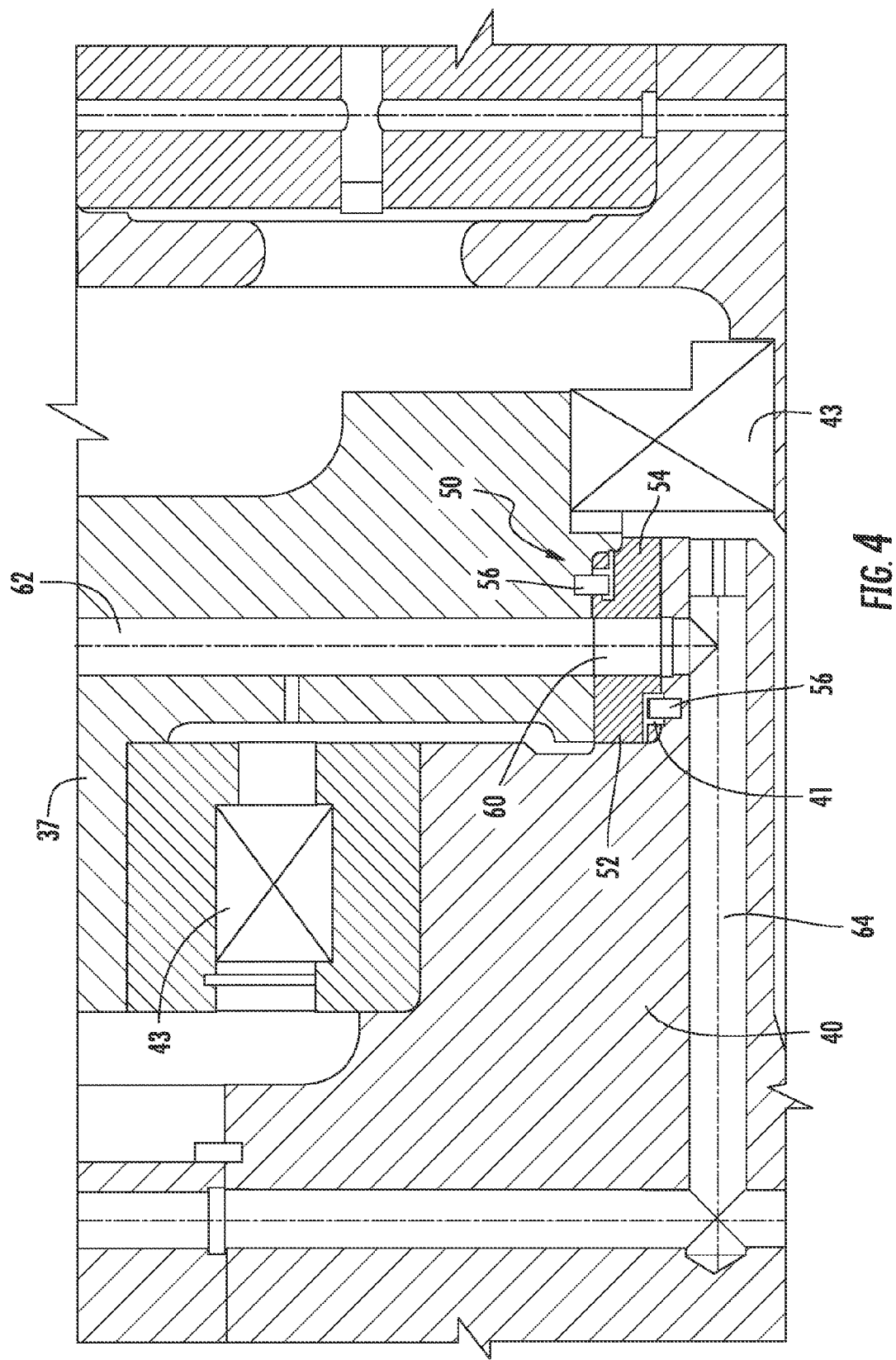
FIG. 4 illustrates a detailed, cross-sectional view of a portion of the gearbox assembly of FIG. 3, particularly illustrating one embodiment of a lubricating ring assembly according to the present disclosure.
Figure 5:
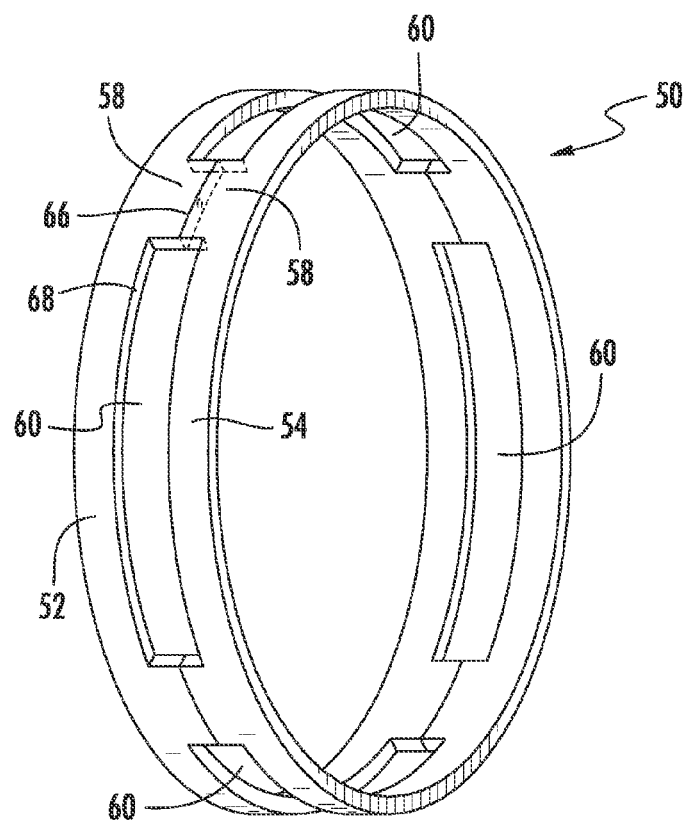
FIG. 5 illustrates a perspective view of one embodiment of a lubricating ring assembly for a gearbox according to the present disclosure.

Accordingly, and referring now to FIG. 4, a detailed, partial view of the gearbox assembly 36 of FIG. 3 illustrated, particularly illustrating a ring assembly 50 configured within the gap 41 between the planetary gear system 38 and the gearbox housing 37. The lubricating ring assembly 50 may have any suitable configuration, all of which are within the spirit and scope of the invention. More specifically, as shown in FIGS. 4-9, various views of multiple embodiments of the ring assembly 50 according to the present disclosure are illustrated. As shown, the ring assembly 50 includes a split-ring configuration having a first ring 52 and a detached, second ring 54. In further embodiments, the ring assembly 50 may have more than two ring portions. Further, as shown in FIG. 5, the first ring 52 and the second ring 54 are arranged together to form a single ring assembly, but are separate, distinct parts as indicated by through line 66.

Figure 6:
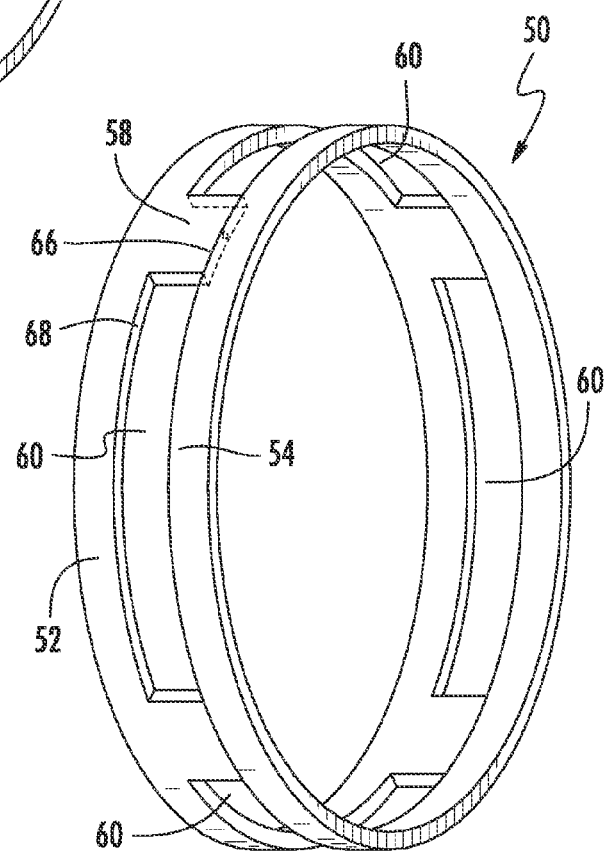
FIG. 6 illustrates a perspective view of another embodiment of a lubricating ring assembly for a gearbox according to the present disclosure.

In addition, either or both of the first or second rings 52, 54 may have one or more protrusions 58 as shown in FIG. 5. For example, as shown, both the first and second rings 52, 54 have corresponding protrusions 58. Thus, the protrusions 58 of the first ring 52 are configured to abut against the protrusions 58 of the second ring 54. In an alternative embodiment, as shown in FIG. 6, either the first ring 52 or the second ring 54 may include one or more protrusions 58. In such an embodiment, the protrusion(s) of one of the ring portions are configured to abut against a side surface 68 of the other ring portion. The assembled ring portions 52, 54 have the same benefits of the embodiment with both ring portions having protrusions 58.

The protrusions 58 of adjacent ring portions 52, 54 may be secured together via any suitable means known in the art, including but not limited to fasteners, adhesive, pins, interlocking features, interference fit, or similar. Similarly, if only one of the ring portions contains protrusions, such protrusions may be secured to a side surface of an adjacent ring portion using any suitable means as described herein.

As such, the first and second rings 52, 54, when arranged together in the gearbox assembly 36, form one or more openings 60 that are configured to direct a lubricant from the gearbox housing 37 to the planetary gear system 38, or more specifically, the planetary carrier 40. For example, as shown in FIGS. 5 and 6, the protrusions 58 create four openings 60 within the ring assembly 50. In additional embodiments, more than four or less than four openings 60 may be included in the ring assembly. Further, the openings 60 may be spaced at any distance apart and may be randomly spaced or evenly spaced.

Figure 7:
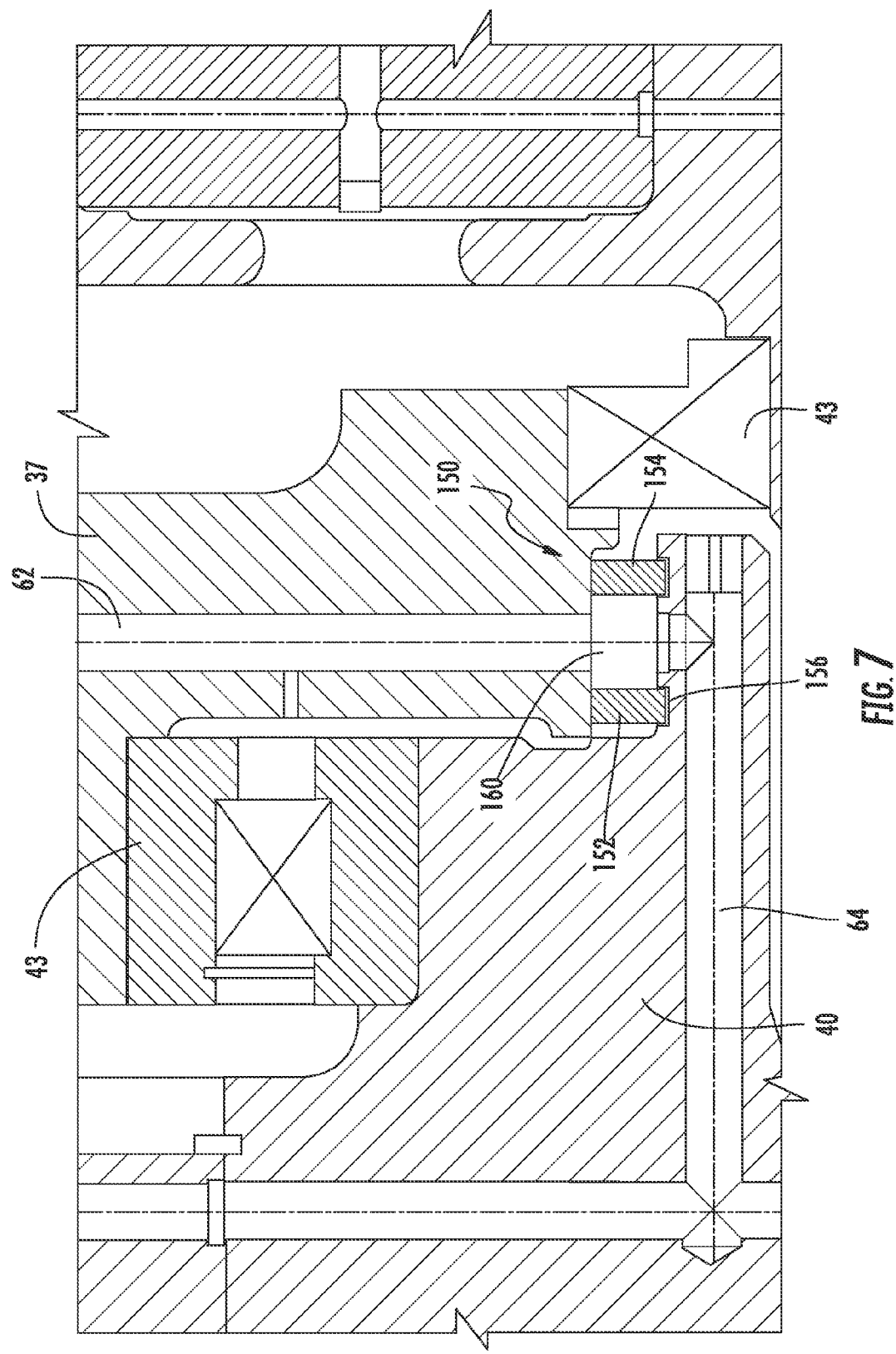
FIG. 7 illustrates a detailed, cross-sectional view of a portion of another embodiment of a gearbox assembly, particularly illustrating another embodiment of a lubricating ring assembly according to the present disclosure.
Figure 8:
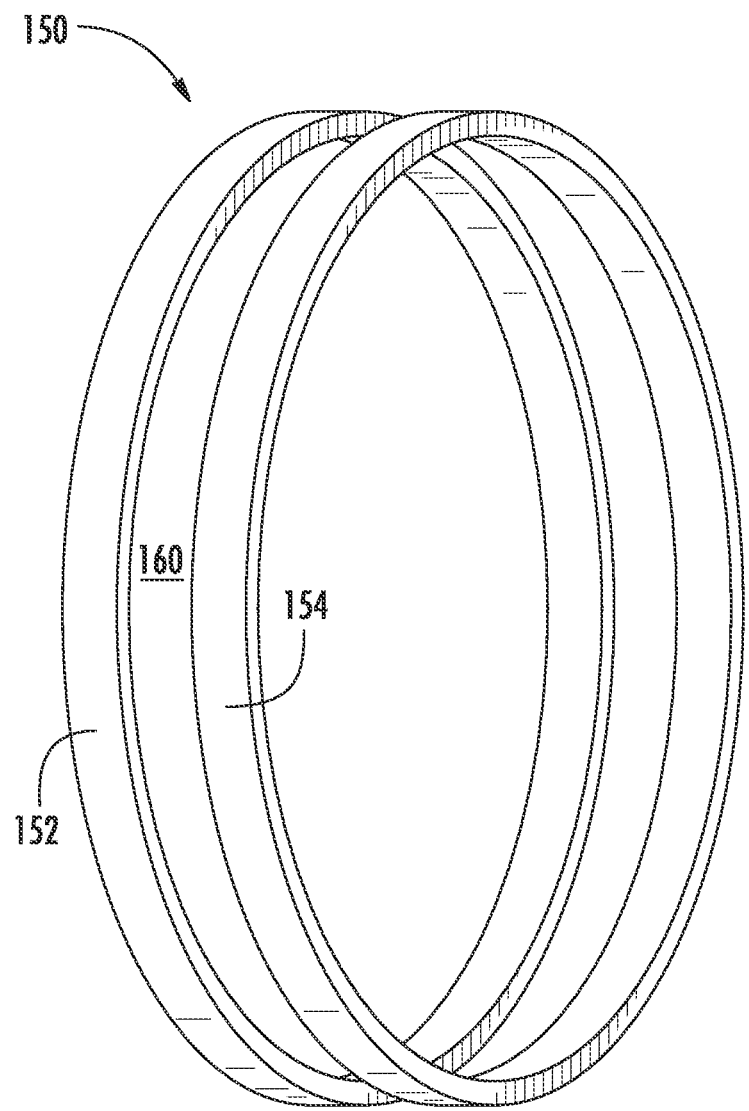
FIG. 8 illustrates a perspective view of another embodiment of a lubricating ring assembly for a gearbox according to the present disclosure.

Referring now to FIGS. 7 and 8, another embodiment of the ring assembly 150 according to the present disclosure is illustrated. As shown, the ring assembly 150 includes a first ring 152 and a second ring 154. In contrast to the embodiment of FIGS. 5 and 6, however, the first and second rings 152, 154 do not contact each other when installed, e.g. via the one or more protrusions 58. Rather, as shown, the ring portions 152, 154 are split and spaced apart to form an opening 160 therebetween that allows oil to pass from the gearbox housing 37 to the planetary carrier 40.

Referring back to FIGS. 4 and 7, the ring assembly 50 may be secured to any suitable component of the gearbox assembly 36 using any suitable means. For example, as shown in FIG. 4, the first ring 52 is fixed to the rotating planetary carrier 40, whereas the second ring 54 is fixed to the gearbox housing 37. In addition, as shown, the ring portions 52, 54 are secured to their respective parts via one or more fasteners 56. In further embodiments, the ring portions 52, 54 may be secured to their respective parts using any other suitable means, including but not limited to fasteners, adhesive, pins, interlocking features, interference fit, or similar. In an alternative embodiment, as shown in FIG. 7, the first and second rings 152, 154 are both fixed to the planetary carrier 40. More specifically, as shown, the first and second rings 152, 154 may fit within a groove 156 of the planetary carrier 40.

Accordingly, the lubricating ring assembly of the present disclosure provides forced lubrication to the components of a planetary gear system and improves the lifetime and function of such components. Thus, it should be understood to those of ordinary skill in the art that the ring assembly may be constructed of any suitable material, including but not limited to rubber, soft metal (e.g. bronze), polymer material, felt material, or similar, so as to avoid wear of neighboring components that may contact the ring assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gearbox assembly, comprising:
    a gearbox housing;
    a planetary gear system configured within the gearbox housing such that a gap is defined therebetween, the planetary gear system comprising a plurality of planet gears, at least one sun gear, at least one ring gear, and a planetary carrier operatively coupled with the plurality of planet gears, the plurality of planet gears being engaged with the ring gear and configured to rotate about the sun gear; and,
    a ring assembly configured within the gap between the planetary gear system and the gearbox housing, the ring assembly comprising a first ring and a detached, second ring, the first and second rings arranged in a side-by-side configuration along an axial direction of the planetary gear system, the first and second rings arranged together so as to form at least one opening extending between the first and second rings, wherein the at least one opening is configured to direct a lubricant from the gearbox housing to the planetary gear system.

2. The gearbox assembly of claim 1, wherein at least a portion of the first ring contacts at least a portion of the second ring.

3. The gearbox assembly of claim 1, wherein the first ring is spaced apart from the second ring to define the at least one opening, the at least one opening comprising a single circumferential opening extending entirely around a circumference of the ring assembly between the first and second rings.

4. The gearbox assembly of claim 1, wherein the gap is located between the gearbox housing and the planetary carrier of the planetary gear system.

5. The gearbox assembly of claim 1, wherein at least one of the first ring or the second ring comprises one or more protrusions on a side surface thereof.

6. The gearbox assembly of claim 5, wherein the one or more protrusions of the first ring abut against the one or more protrusions of the second ring.

7. The gearbox assembly of claim 5, wherein the one or more protrusions of the first ring abut against a side surface of the second ring.

8. The gearbox assembly of claim 1, wherein the first ring is fixed to the planetary carrier and the second ring is fixed to the gearbox housing.

9. The gearbox assembly of claim 1, wherein the first and second rings are both fixed to one of the planetary carrier or the gearbox housing.

10. The gearbox assembly of claim 1, wherein at least one of the first or second rings is fixed to the gearbox housing.

11. The gearbox assembly of claim 1, wherein at least one of the first or second rings is fixed to the planetary carrier.

12. The gearbox assembly of claim 1, wherein the ring assembly comprises one or more additional rings configured with the first and second rings.

13. A lubrication system for a gearbox, the lubrication system comprising:
    a ring assembly comprising a first ring and a detached, second ring, the first and second rings arranged in a side-by-side configuration along an axial direction of the gearbox, the first and second rings configured to fit within a gap located between a planetary gear system and a gearbox housing of the gearbox,
    wherein, when installed, the first and second rings of the ring assembly are arranged together so as to form at least one opening therebetween, wherein the at least one opening is configured to direct a lubricant from the gearbox housing to the planetary gear system.

14. The lubrication system of claim 13, wherein at least a portion of the first ring contacts at least a portion of the second ring.

15. The lubrication system of claim 13, wherein the first ring is spaced apart from the second ring to define the at least one opening, the at least one opening comprising a single circumferential opening extending entirely around a circumference of the ring assembly between the first and second rings.

16. The lubrication system of claim 13, wherein at least one of the first ring or the second ring comprise one or more protrusions on a side surface thereof.

17. The lubrication system of claim 16, wherein the one or more protrusions of the first ring abut against at least one of the one or more protrusions of the second ring or a side surface of the second ring.

18. The lubrication system of claim 13, wherein the first ring is fixed to the planetary carrier and the second ring is fixed to the gearbox housing.

19. The lubrication system of claim 13, wherein the first and second rings are both fixed to one of the planetary carrier or the gearbox housing.

\* \* \* \* \*